July 16, 1963 J. SMITH 3,098,180
REMOTE CONTROL FOR MICROWAVE SYSTEM
Filed March 10, 1960
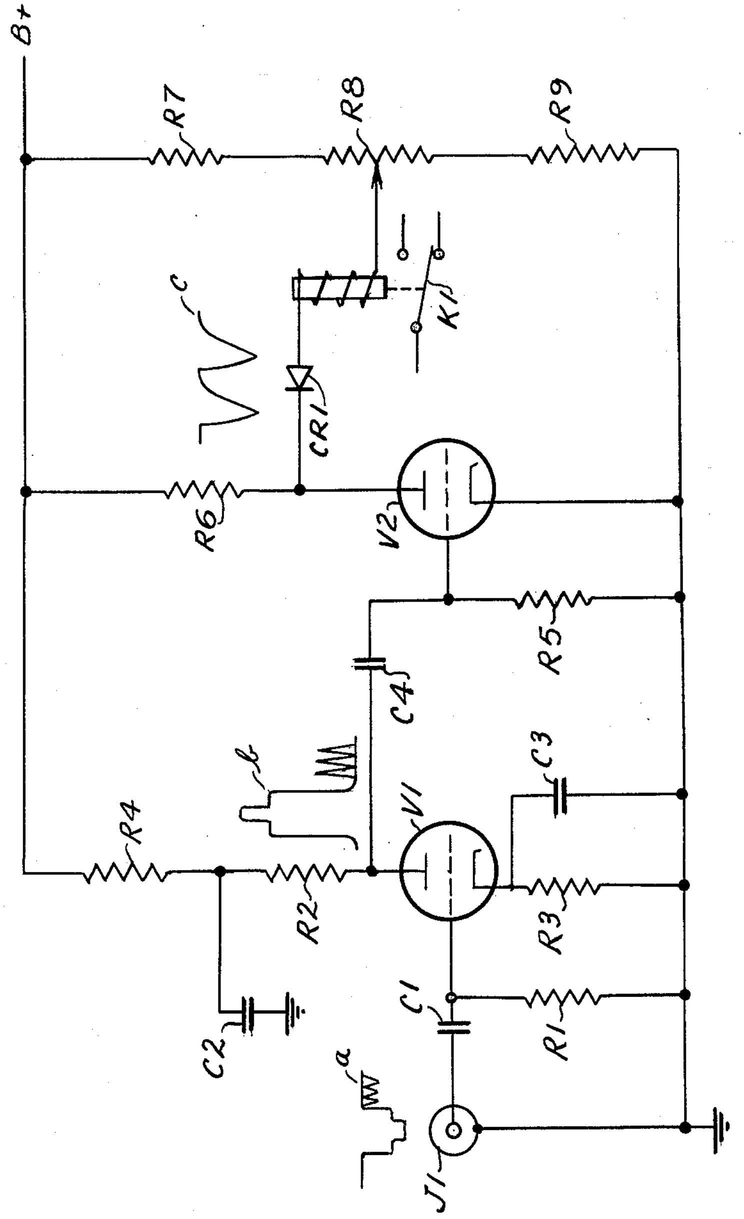
INVENTOR.
Jack Smith
BY
Joseph P. Kates
ATTORNEY United States Patent Office 3,098,180

Patented July 16, 1963

3,098,180

REMOTE CONTROL FOR MICROWAVE SYSTEM

Jack Smith, Lynchburg, Va., assignor to General Electric Company, a corporation of New York Filed Mar. 10, 1960, Ser. No. 14,085
5 Claims. (Cl. 317—149)

The present invention relates to remote control for a microwave system and more particularly relates to a means and a method to turn an apparatus such as an unattended television microwave system on and off selectively from a remote point using repetitive pulse signals such as television synchronizing pulses from the composite television video signals for a control signal. The presence or absence of the pulse signal selectively causes a first or a second level condition of voltage or current to operate a condition responsive switching device.

In this invention the composite video signal from the broadcasting studio is amplified in a narrow bandwidth video amplifier with reversal of the synchronizing signal. The narrow bandwidth video amplifier rejects the high frequency components of the signal allowing only the energy in the frequency range below about 20 kilocycles to pass, thus eliminating the higher frequency noise. The output of the narrow bandpass amplifier is fed to a synchronizing pulse separator (synch separator) to obtain output pulses only on the plate of the synch separator at the horizontal rate of 15.75 kc. (kilocycles). A relay is connected to the synch separator plate at one end and has its other end connected to a source of voltage such that the voltage levels at the plate, which will be at a first level or a second level depending upon whether or not synchronizing signals are present, block current flow in the presence of signals to keep the relay continuously de-energized while synchronizing signals are broadcast regardless of the amount of noise which accompanies the synchronizing pulses. When in energized condition, the relay turns off the repeater station and in the presence of synchronizing signals the repeater station will be continuously turned on.

The Federal Communication Commission requires that in a television wicrowave system, if an unattended repeater station is used, some means to turn the system on and off at will must be employed.

Prior art systems are exemplified by U.S. Patent 2,726,325, of Beers, Jr., et al. for Carrier-Operated Relay Circuit, issued December 6, 1955, and U.S. Patent 2,597,043, of Treadwell for Automatic Replacement of Defective Repeaters in High-Frequency Electric Communication Systems, issued May 20, 1952.

Prior art methods of effecting turn off and turn on of unattended repeater stations employ the receiver automatic gain control voltage to perform the control function. When the radio frequency (RF) carrier is received, the AGC (automatic gain control) voltage is of such a value as to activate a control circuit to cause the transmitter of the repeater station to transmit. When the RF carrier signal is appreciably lowered or when no RF carrier signal is received, the AGC voltage changes to cause the control circuitry to shut off the transmitter.

The disadvantage of this method of automatic turn off is that the system can be cut off when a fade of the microwave radio frequency signals occurs. Another disadvantage is that the automatic gain control systems of the prior art methods were not sensitive enough because during an RF fade, a television picture may be transmitted which is very noisy but which can be used on the air at the receiving station's discretion. The prior art RF carrier system using automatic gain control does not have the sensitivity to prevent the system from turning off and thereby removing the picture during a fade out of the carrier as well as when permanent loss of signal occurs.

The present invention overcomes these and other disadvantages of the prior art methods and increases the drop out sensitivity. Therefore, regardless of noise of the TV picture or of radio frequency fade out, the picture is not cut off except when no synchronizing signals are being transmitted. The invention also provides a positive way of cutting off the system at the broadcast studio by discontinuing the transmission of the composite signal.

Accordingly, a principal object of the present invention is to provide a means and method for turning an unattended repeater station in a television microwave relay system on and off at will in compliance with Federal Communications Commission requirements.

Another purpose of the present invention is to provide for remote switching on and off of a system such as an unattended television microwave system by utilizing presence or absence of recurring pulses such as composite television synchronizing pulses as a control function to switch on in the presence of and off in the absence of such pulses to thereby provide for transmission or other operation whenever such pulses are present, even in the presence of high noise conditions.

Another aim of the present invention is to provide a relatively simple yet comparatively foolproof apparatus for insuring duration of television broadcasting in a repeater system during duration of the composite video synchronizing signal and which apparatus turns off the system upon either deliberate or accidental failure to transmit the composite television picture signal.

While the novel and distinctive features of the invention are particularly pointed out in the appended claims, a more expository treatment of the invention, in principle and in detail, together with additional objects and advantages thereof is afforded by the following description and accompanying drawing in which:

The FIGURE is a schematic representation of one preferred embodiment of a circuit illustrative of the present invention.

In the description below, the word "synchronizing" is used interchangeably with "synch" which is a commonly used abbreviation therefor in the art.

Now referring to the figure, a jack J1 is provided at which the composite television signal may be inserted. A stage V1 is provided. Stage V1 may comprise a triode vacuum tube stage having an anode, a cathode, and a control electrode. Disposed between the control electrode or grid of stage V1 and ground may be a grid resistor R1. Disposed between the inner conductor of jack J1 and the grid of stage V1 is an input coupling capacitor C1. The outer connection of jack J1 is grounded. Disposed between the cathode of stage V1 and ground is a bias resistor R3. In parallel with resistor R3 is a by-pass capacitor C3.

A source of voltage B+ is provided which is of the order of 250 volts. Disposed between the source of voltage B+ and the plate or anode of stage V1 may be a plate voltage dropping resistor R4 and a plate load resistor R2. A decoupling capacitor C2 is disposed between the junction of resistors R2 and R4 and ground.

Stage V1 has high gain and low bandwidth due to the type of tube chosen and the value of resistance of plate load resistor R2.

The low bandwidth of stage V1 cuts out high frequency noise while allowing the 15.75 kc. (kilocycles) horizontal synchronizing pulses to pass. A synchronizing separator stage V2 may be provided which may be a triode and have a plate or anode, a cathode and a grid. The cathode is grounded. A coupling capacitor C4 couples output from the plate of stage V1 to the grid of stage V2. A grid return resistor R5 is disposed between the grid of stage V2 and ground. A plate voltage dropping resistor R6 which is the plate load for stage V2 is disposed between the B+ supply and the plate or anode of stage V2. Disposed between the B+ source and ground is a voltage divider comprising resistor R7, the resistance portion of potentiometer R8, and resistor R9. Potentiometer R8 has a movable contact which slidably engages its resistance portion. Disposed between the plate of stage V2 and the movable contact arm of the potentiometer R8 in series is a diode CR1 and the coil or inductor of a relay K1. The cathode of diode CR1 is connected to the plate of stage V2 and its anode connected to one end of the coil.

The end of the relay coil of relay K1 opposite the diode CR1 connected end is connected to the movable contact arm of potentiometer R8. The relay K1 is shown in its normal de-energized condition with its movable contact in the lower position shown on the FIGURE. The contacts of the relay K1 may be connected to the repeater transmitter. When the movable contact arm is in the position closing the upper contact, connection is effected to turn the repeater transmitter off. When the movable contact arm of relay K1 is in the position closing the lower contact connection is effected to sustain operation of the remote repeater transmitter. Each repeater station of the system has one of the inventive devices illustrated in the FIGURE installed in it to control its transmitter.

Operation occurs as follows:

The composite video signal comprising the synchronizing pulses and the video is fed into jack J1. This signal has a peak to peak amplitude of 1.0 volt. At jack J1, the composite signal comprising the synchronizing pulses and video signals are received as shown by waveform *a* in the negative going direction. This conforms with normal transmission of video which is in the negative going direction. The incoming waveform *a* signals are coupled through coupling capacitor C1 to the grid of high gain, low bandwidth stage V1. The low bandwidth of stage V1 cuts out high frequency noise and allows the 15.75 kc. horizontal synchronizing pulses to pass. Frequencies above about 20 kilocycles are beginning to be cut off by this circuit. In designing for maximum gain up to about 15 kilocycles frequency, advantage is taken of the gain versus bandwidth ratio, wherein as gain increases, the bandwidth goes down. Therefore the type of tube is selected for high gain of the stage and maximum conduction is designed to occur up to the 15 kilocycle frequency.

The video signal *a* is amplified and inverted. It appears at the plate of tube V1 as the positive going waveform shown in waveform *b* and has an amplitude of about 16 volts. Because of the narrow bandwidth of the stage, the sharp edges are rounded (see waveform *b*).

The positive going synchronizing signal of waveform *b* is coupled through capacitor C4 to the grid of stage V2. The grid and cathode of stage V2 act as a diode clamp circuit to clamp the tip of the synchronizing waveform to ground potential. Because the cathode of Stage V2 is grounded, its grid assumes as a maximum the potential of the cathode which is ground. The video signal at the grid of stage V2 goes negative from the tip of the synch pulse which is clamped at ground.

The tube V2 is a type selected for its sharp grid cut off characteristic. At zero volts on the grid, saturated plate current is drawn. At approximately minus three volts on its grid, stage V2 will be just about at the point of cut off. Thus, the signal is effective between the synch tip (which is clamped to ground or zero potential) and the minus three volts (—3 v.) level. Although the entire signal from the synch tip to the bottom of the waveform has an amplitude of 16 volts, just the tip of the synch portion down to —3 volts of that 16 volts is utilized. Hence, only the synchronizing pulses pass through the stage V2 and the video signals are removed by the cut off characteristics of the tube.

With synch pulses (waveform *b*) present at the grid tube V2 conducts only during approximately 10% of the time. Therefore, since the output voltage waveform *c* at the plate of stage V2 comprises negative going fairly sharp pulses, the average voltage on the plate is high being in the order of 200 volts when synchronizing voltage signals are present.

When there is no signal on the grid, that is when there is no composite video signal with its synchronizing pulses being transmitted, stage V2 conducts 100% of the time, because of its grounded grid. Upon steady conduction in saturation of stage V2, the current through the plate resistor R6 drops the plate voltage to approximately 100 volts. As stated, the diode CR1 and the inductor or coil of relay K1 are connected between the plate and the adjustable tap on potentiometer R8 at a voltage of approximately 150 volts set by the position of the tap on potentiometer R8 of the voltage divider R7, R8 and R9. Therefore, with synchronizing pulses present and a voltage of the order of 200 volts at the plate of stage V2, the cathode of diode CR1 will be at a higher voltage than its anode. The anode of diode CR1 is approximately at the tap point voltage of 150 volts. Under these normal operating conditions, with video signals being transmitted, the relay K1 is de-energized and its movable contact as shown in the FIGURE is in lower or repeater relay station transmitting position. Upon the cessation of or the absence of video signal output from the broadcasting studio, because of the lack of signals at the grid of stage V2, it is continuously at ground potential and the continuous current flow in saturation causes voltage at the plate of stage V2 to drop to 100 volts. Therefore the voltage at the cathode of diode CR1 is about 50 volts below the voltage of its anode which is at about 150 volts from the tap of potentiometer R8.

Under such conditions current flow in magnitude sufficient to actuate relay K1 will flow through the diode CR1 in its forward direction and thence through the inductor of that relay to energize it. Upon energization of relay K1, its contact is moved to the up position. In this position, conventional means (not shown) can be utilized to inactive the microwave repeater station transmitter.

The diode CR1 presents a high impedance in its reverse direction when the synch signal is present. With synch signals transmitted the plate voltage is 200 volts. Hence the cathode of diode CR1 is at a higher potential than its plate and relay K1 is not energized. When the pulses disappear and the plate voltage drops to 100 volts, the bias is in the forward going direction, and therefore the diode conducts heavily to energize relay K1. The invention thereby provides control means which, depending upon the absence or presence of a composite video signal, permits performance of a function such as that of turning an unattended microwave system off and on from a remote location. The narrow bandwidth of stages V1 and V2 (stage V2 has a much narrower bandwidth than stage V1) permits the synch pulse to be detected even with conditions of extreme noise superimposed on the video signal which would, in the absence of the invention, obliterate this signal. Thus, the invention provides increased sensitivity as compared with methods such as that of using AGC voltage only to perform the control function.

It should be understood of course that the present inventive system does not preclude the use of AGC voltage, also, as a control function such that should the radio frequency signal be seriously lowered or cut off, the automatic gain control turns the system off and the inventive system simultaneously operates when the composite video signals are not being transmitted.

It should further be understood that the invention is not limited to control of an unattended television microwave system and to utilization of composite television synch pulses. The invention contemplates use for such applications as turning on and off of various kinds of equipment in response to a particular waveform at a particular frequency being transmitted.

The illustrative inventive structure comprises first and second successive narrow band amplifier stages receptive to incoming repetitive pulses. The narrow band feature eliminates noise superimposed on the incoming pulses. The second stage is a sharp cut off type so that in the absence of pulse input, a large difference in current occurs to enable operation of a current responsive D.C. relay when pulses are absent.

An important part of the invention is the use of narrow bandwidth circuits to restrict the turn off to signals in a relatively narrow bandwith of frequencies which may be present or absent.

The selection of the type tube for stage V2 is important in conjunction with the use of the diode and the relay inasmuch as the tube is selected with current characteristics such that sufficient current to provide turn off and turn on of the relay is effected. The tube characteristics of sharp cut off are also important.

While in nowise to be considered as limiting the invention, one successful embodiment used the following values.

| Part: | Value or designation |
|---|---|
| Tube V1 | ½ of 6201. |
| Tube V2 | ½ of 6201. |
| Capacitor— | |
| C1 | 0.1 microfarad. |
| C2 | 5 microfarads (450 volts, electrolytic). |
| C2 | 5 microfarads (6 volts, electrolytic). |
| C4 | 0.01 microfarad. |
| Resistor— | |
| R1 | 1 megohm. |
| R2 | 4.7K ohms. |
| R3 | 100 ohms. |
| R4 | 5.6K ohms. |
| R5 | 1 megohm. |
| R6 | 47K ohms. |
| R7 | 2.0K ohms. |
| R9 | 6.3K ohms. |
| R8 | 2.5K ohms. |
| Diode CR1 | 1N90. |

Legend: K=1000

The specific "Synch Separator" circuit used was that of U.S. Patent 2,625,603 of Gruen and Zaloudek.

While a specific embodiment of the invention has been shown and described, it should be recognized that the invention should not be limited thereto. It is accordingly intended in the appended claims to claim all such variations as fall within the true spirit of the invention.

What is claimed is:

1. Remote control apparatus adapted to respond to the selective presence or absence of repetitive pulse signals comprising means for deriving said repetitive pulse containing signal, an amplifier coupled to said means including an active element and a load impedance, said active element being responsive in the presence or absence of said pulses to assume one or the other of two conduction conditions and thereby causing one of two voltages to appear across said load impedance, and voltage responsive switching means responsive to change of said voltage in said load impedance comprising a relay coupled in series with a unidirectional conductive means between said load impedance and a source of potential intermediate the potentials appearing at said load impedance at said respective conduction conditions.

2. Remote control apparatus as set forth in claim 1 wherein said amplifier includes a self-biasing circuit employing a sharp cut off vacuum tube as the active element.

3. Remote control apparatus as set forth in claim 1 wherein at least one of said conduction conditions is a terminal conduction condition.

4. Remote control apparatus as set forth in claim 1 wherein said repetitive pulse containing signal is a television video signal containing horizontal synchronizing pulses, and wherein said active element assumes a condition of conduction in the absence of said pulses and of near cut off operation in the presence of horizontal synchronizing pulses.

5. Remote control apparatus as set forth in claim 1 wherein said amplifier comprises two stages, the first stage being a narrow bandwidth amplifier selective of said pulse signals and rejective of high frequency noise accompanying said pulses, and wherein said second stage includes said active element.

References Cited in the file of this patent

UNITED STATES PATENTS

| | | |
|---|---|---|
| 1,626,480 | Perkins | Apr. 26, 1927 |
| 1,776,219 | Fluharty | Sept. 16, 1930 |
| 2,625,603 | Gruen et al. | Jan. 13, 1953 |
| 2,781,505 | Grant | Feb. 12, 1957 |
| 2,956,118 | Goodrich | Oct. 11, 1960 |

OTHER REFERENCES

Publication: "Electronic and Radio Engineering," by F. E. Terman, 4th edition, published by McGraw-Hill Book Co. (pp. 993–994).